United States Patent [19]
Taylor

[11] 3,819,414
[45] June 25, 1974

[54] STORAGE BATTERY AND POSITIVE ELECTRODE THEREFOR

[75] Inventor: Dale F. Taylor, Schenectady, N.Y.

[73] Assignee: General Electric Company, Schenectady, N.Y.

[22] Filed: Oct. 2, 1972

[21] Appl. No.: 294,023

[52] U.S. Cl. .................................. 136/26, 136/64
[51] Int. Cl. ................... H01m 39/00, H01m 35/02
[58] Field of Search ............................. 136/26–27, 136/76, 34, 64, 19, 77–78, 65, 127, 147; 204/53; 423/619

[56] References Cited
UNITED STATES PATENTS

| | | | |
|---|---|---|---|
| 3,087,870 | 4/1963 | Zimmerman | 204/32 |
| 3,486,940 | 12/1969 | Ruben | 136/26 |
| 3,576,674 | 4/1971 | Ruben | 136/26 |
| 3,615,831 | 10/1971 | Ruben | 136/26 |
| 3,629,006 | 12/1971 | Hill | 136/27 |
| 3,629,007 | 12/1971 | Kilduff | 136/27 |

*Primary Examiner*—Anthony Skapars
*Attorney, Agent, or Firm*—Paul R. Webb, II; Joseph T. Cohen; Jerome C. Squillaro

[57] ABSTRACT

A storage battery is described which includes an improved positive electrode. Such an electrode comprises a supporting base of an electrically conductive material inert to corrosion in sulfuric acid, a non-polarizing layer adhering to the surface of the supporting base, an electrodeposited layer of chemically inert beta-lead dioxide adhering to the surface of the non-polarizing layer, and a layer of chemically active lead dioxide adhering to the electrodeposited beta-lead dioxide layer.

6 Claims, 1 Drawing Figure

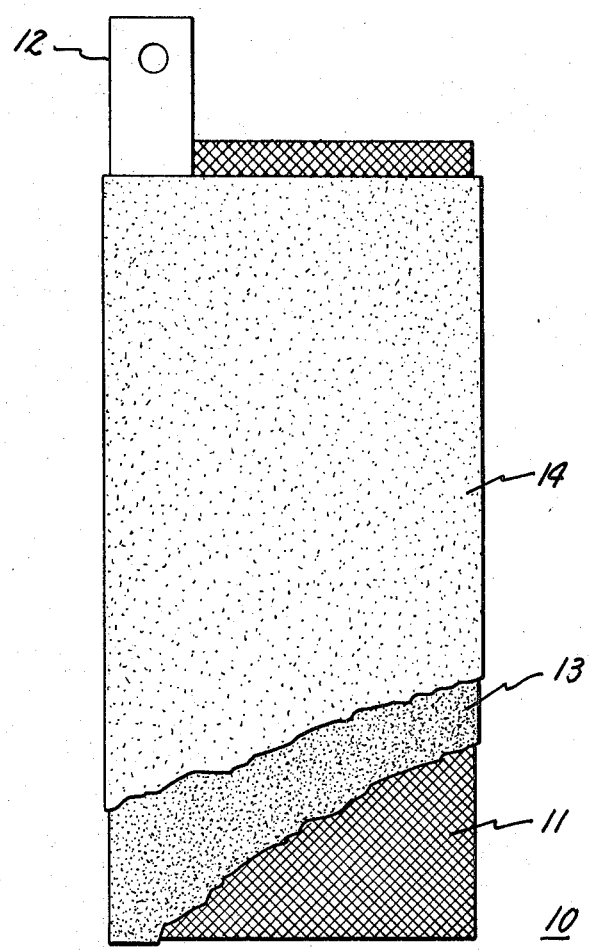

STORAGE BATTERY AND POSITIVE ELECTRODE THEREFOR

This invention relates to storage batteries and positive electrodes therefor, and more particularly, to sulfuric acid storage batteries employing an improved, lightweight positive electrode.

In U.S. Pat. No. 3,486,940 issued Dec. 30, 1969, there is described a storage battery having a positive electrode comprising a supporting base of titanium nitride having a surface film of non-polarizing material, such as gold. Active material is electroplated or pasted on the surface of the gold film.

The present invention is directed to a storage battery and positive plate therefor wherein energy density and cycling capacity are greatly improved.

I found also as described in the above Ruben patent an expanded metal grid reduced substantially the weight of the positive electrode, and that a non-polarizing layer was necessary. As opposed to the teachings of this patent, I found that nitriding was unnecessary. I discovered unexpectedly that to increase cycling capacity an electrodeposited layer of chemically inert beta-lead dioxide was required on the surface of the non-polarizing layer.

The primary objects of my invention are to provide a lightweight positive plate with high energy density and excellent cycling capacity.

In accordance with one aspect of my invention, an electrode has an electrodeposited layer of chemically inert, beta-lead dioxide between the non-polarizing layer and the chemically active lead dioxide layer which layers have a lightweight metallic supporting base.

These and various other objects, features and advantages of the invention will be better understood from the following description taken in connection with the accompanying drawing in which:

The single FIGURE is a partial sectional view of an electrode made in accordance with my invention.

In the single FIGURE of the drawing, there is shown generally at 10 an electrode embodying my invention. Electrode 10 is shown with a substrate or grid 11 of niobium mesh with a non-polarizing layer of gold adhering thereto. A tab 12 is affixed to a portion of substrate 11. An electrodeposited layer 13 of beta-lead dioxide adheres to the gold layer on substrate 11. A layer 14 of chemically active lead dioxide adheres to the surface of beta-lead dioxide layer 13. The resulting structure is a lightweight electrode which is useable as the positive plate in a sulfuric acid battery employing a negative electrode.

In such a storage battery, a chemical inert casing has one or more positive and negative plates spaced apart and interleaved. Both plates are in contact with a sulfuric acid electrolyte. The negative plate can be a conventional lead plate. The positive electrode is the electrode embodying my invention.

I found that I could form an electrode comprising a supporting base of an electrically conductive material which is inert to corrosion in sulfuric acid. I found that a wide variety of suitable supporting bases are available. As opposed to the above-mentioned Ruben patent, I found that nitriding was unnecessary. Preferred supporting base materials include tantalided nickel, titanium, niobium and titanium plus 5 percent of tantalum alloy. Various other materials which are inert to corrosion in sulfuric acid would also be suitable. Such materials must be sufficiently electrically conductive in addition to their ability to withstand the oxidizing corrosive environment of being the base for an electrode in sulfuric acid. Such additional materials would include the so-called "valve" metals zirconium, hafnium, tantalum, tungsten, all of which form refractory insulating oxide layers upon anodization.

The supporting base materials can also be corrodible metals or other substrates which are coated or surface alloyed with one of the above materials thereby providing the inertness to the corrosion effects. Additionally, corrodible or other type of substrates can be alloyed with one or more of the above inert type metals to provide suitable supporting bases.

Such an electrically conductive supporting base can also be provided by interstitial carbides, borides and nitrides which form with most transition metals. Of this latter group the most suitable would be the carbides, borides and nitrides of transition metals in Groups IV, V and VI of the periodic table which include titanium, zirconium, hafnium, vanadium, niobium, tantalum, chromium, molybdenum and tungsten. These interstitial compounds have the common desirable properties of metallic appearance, hardness, electrical conductivity and are chemically very inert. While the supporting base may be used in various configurations such as grids, punched metal, expanded metal and corrugated metal it is preferred to use the material in its expanded form. While as mentioned above chemically inert or corrosion resistant coatings can be employed on corrodible or other type of base material, chemically inert conductive metals can be employed alone as a supporting base. If such a chemically inert metal is used as a supporting base a metal may be coated thereon, if desired, but such metal does not appear necessary.

A non-polarizing layer adheres to the surface of the supporting base of various non-polarizing materials, gold is preferred. While various ways are suitable for applying the non-polarizing layer to the supporting base it is preferred to electrodeposit the gold on the base.

While the above Ruben patent adheres a layer of chemically active lead dioxide directly to the gold surface, I found unexpectedly that an electrodeposited layer of chemically inert beta-lead dioxide must be applied to the gold surface prior to the adhesion of the chemically active lead dioxide. In the absence of electrodepositing the chemically inert beta-lead dioxide on the gold surface, a cell including such an electrode will operate but its cycle life is extremely short. I have found that by the employment of such an improved electrode in accordance with my invention that I can provide a cycling capacity for a sulfuric acid storage cell which is equivalent to the conventional storage cell but reduce the weight load of the conventional lead grid substantially.

A non-polarizing layer of gold is not in itself sufficient for acceptable electrode performance since the gold is subject to electrical oxidation when the plate is being charged unless it is adequately protected. My unique discovery of a provision of an electrodeposited layer of beta-lead dioxide on the surface of the gold prior to the adhesion of the chemically active lead dioxide fulfills this requirement.

Electrodeposited beta-lead dioxide is a hard, dense, low porosity form of the positive active material of lead dioxide. The electrodeposited beta-lead dioxide has a higher oxygen over voltage and does not enter into the electrical action during battery cycling. Electrodeposited beta-lead dioxide is highly conductive and, except for brittleness, would serve well as a satisfactory current collector.

If the beta-lead dioxide is deposited directly on a conductive supporting base which is inert to corrosion a passivating layer is formed at the supporting base-beta-lead dioxide interface and the resulting plate is entirely unsatisfactory. However, when a non-polarizing layer of gold is applied to the supporting base before the electrodeposition of the beta-lead dioxide this problem is eliminated and there results a superior plate. A layer of chemically active lead dioxide adheres to the surface of the beta-lead dioxide. Such chemically active lead dioxide can be formed in any conventional manner. For example, pasting can be employed which uses a mixture of lead oxide, lead, water and sulfuric acid on the electrodeposited beta-lead dioxide. After curing, the pasted material is converted to the active layer of lead dioxide by electrochemical oxidation.

A storage battery is assembled by employing a suitable non-corrodible container with a plurality of positive and negative plates which are spaced apart and interleaved. The plates are in contact with a sulfuric acid electrolyte within the container. Conventional lead negative plates can be employed. Superior results are obtained when positive electrodes embodying my invention are employed. Examples of electrodes and batteries made in accordance with my invention are as follows:

EXAMPLE I

An electrode was made in accordance with my invention which comprised a supporting base with a core of electrically conductive, corrodible nickel mesh with nominal dimensions of 3 inches × 3½ inches. The surface of the nickel mesh was alloyed with 0.7 grams of tantalum. A non-polarizing layer of gold consisting of 2.48 grams of gold was electroplated on the tantalum layer of the supporting base. Subsequently, 11.6 grams of beta-lead dioxide was electroplated on the gold surface, total weight of 21.4 grams. A layer of active lead dioxide was formed on the beta-lead dioxide layer by pasting a mixture of 80 percent by weight PbO and 20 percent by weight of Pb in water and sulfuric acid. After curing, the pasted material was converted to the active layer of lead dioxide by electrochemical oxidation. The active material consisted of 53.5 grams which was its cured weight.

EXAMPLE II

The electrode of Example I was subjected to severe deep discharge cycling which employed an 8 hour cycle at 2 amperes current. The test included 4 hours of charge followed by discharge to 0 volts versus an Hg/Hg$_2$SO$_4$/electrolyte reference electrode with open circuit to the start of the charge. The specific gravity of the H$_2$SO$_4$ electrolyte was 1.28 at full charge. The electrode delivered 6.3 amp hours initially for a theoretical utilization of 51 percent. The plate was still delivering 60 percent of this capacity when it failed after 104 cycles. The reason for this failure appeared to be imperfection in the tantalum/nickel surface layer and corrosion of the underlying nickel. This superior performance was almost identical to that of an electrode of the same size and capacity pasted on a conventional cast lead/Sb grid with a grid weight of 43.1 grams which failed after 120 cycles.

EXAMPLE III

In contrast to applicant's electrode and its performance as set forth in Examples I and II identical tantalided nickel supporting bases were electroplated with 1.32 and 1.49 grams of gold respectively and 0.95 grams of lead respectively. Active lead dioxide of 45.3 and 53.1 grams respectively were formed onto the gold surface as described above in Example I. Adhesion of the active lead dioxide material was poorer on cycling than in applicant's electrode. Both of these electrodes were subjected to the same type of test as set forth above in Example II. The capacities of both of these plates dropped off to less than 40 percent of discharge capacity in less than 25 cycles. Subsequently, examination of the grids revealed oxidation of the gold and lead coatings.

EXAMPLE IV

A storage battery was constructed employing four of applicant's electrodes as the positive plates. Each of these electrodes was made of pure niobium expanded metal. Each electrode was 3 inches × 3.5 inches with a 30 mil niobium wire welded down one side to make electrical contact. Each supporting base was coated by electrodeposition with 0.1 grams of gold and electrocoated subsequently with 2.0 grams of beta-lead dioxide for a total grid weight of approximately 8.5 grams per electrode. Each electrode was formed with approximately 51 grams of active lead dioxide as described above in Examples I and III. These four electrodes were positioned in a non-corrodible container as the positive electrodes. Five negative electrodes were positioned also in the container and spaced from and interleaved from the positive plates. Each negative electrode contains a lead plated expanded copper grid. Conventional separators and terminals were employed. The electrolyte was sulfuric acid of specific gravity of 1.28 at full charge. This lightweight positive electrode resulted in cell energy density of greater than 25 watt hours per pound on the 20 hour rate for more than 15 cycles. This battery was cycled in excess of 100 times before the capacity fell to 50 percent of the original capacity and the test was terminated.

Upon examination of the positive plates they were found to be in very good condition with the majority of the gold layers still unoxidized and protected by the beta-lead dioxide. The reduction in capacity was primarily the result of active material loss from the outer edges of the plates. Such condition is easily remedied by use of glass wool watting or other means of physically preventing such shedding. Active material adhesion in the central portions of the plate was excellent. There was no evidence of corrosion.

While other modifications of the invention and variations thereof which may be employed within the scope of the invention have not been described, the invention is intended to include such as may be embraced within the following claims:

What I claim as new and desire to secure by Letters Patent of the United States is:

1. An electrode consisting of an electrically conductive supporting base inert to corrosion in sulfuric acid, a non-polarizing layer adhering to the surface of the supporting base, an electrodeposited layer of chemically inert beta-lead dioxide adhering to the surface of the non-polarizing layer, and a layer of chemically active lead dioxide adhering to the surface of the electrodeposited beta-lead dioxide layer.

2. An electrode as in claim 1, in which the supporting base comprises a core of an electrically conductive corrodible material, and a layer of an electrically conductive material inert to corrosion in sulfuric acid adhering to the core.

3. An electrode as in claim 1, in which the supporting base comprises a core of an electrically conductive material inert to corrosion in sulfuric acid, and a layer of a different electrically conductive material inert to corrosion in sulfuric acid adhering to the core.

4. A storage battery comprising a container, an electrolyte of sulfuric acid within the container, a plurality of spaced apart positive and negative electrodes in contact with the electrolyte, the positive electrode as in claim 1, which consists of an electrically conductive supporting base inert to corrosion in sulfuric acid, a non-polarizing layer adhering to the surface of the supporting base, an electrodeposited layer of chemically inert beta-lead dioxide adhering to the surface of the non-polarizing layer, and a layer of chemically active lead dioxide adhering to the surface of the electrodeposited beta-lead dioxide layer, and the negative electrode comprising lead.

5. A storage battery as in claim 4, in which the supporting base of the positive electrode comprises a core of an electrically conductive corrodible material, and a layer of an electrically conductive material inert to corrosion in sulfuric acid adhering to the core.

6. A storage battery as in claim 4, in which the supporting base of the positive electrode comprises a core of an electrically conductive material inert to corrosion in sulfuric acid, and a layer of a different electrically conductive material inert to corrosion in sulfuric acid adhering to the core.

* * * * *